Patented Mar. 31, 1925.

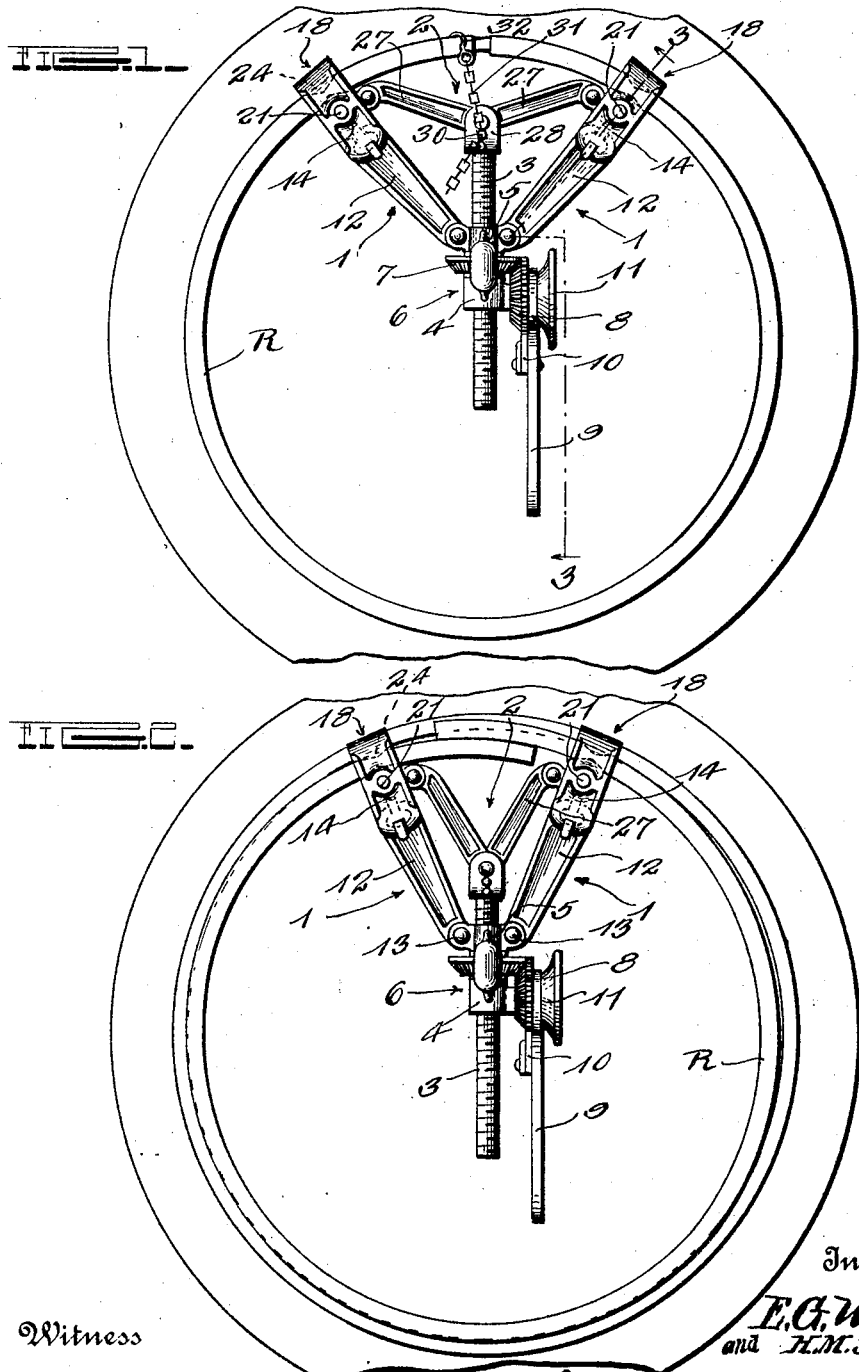

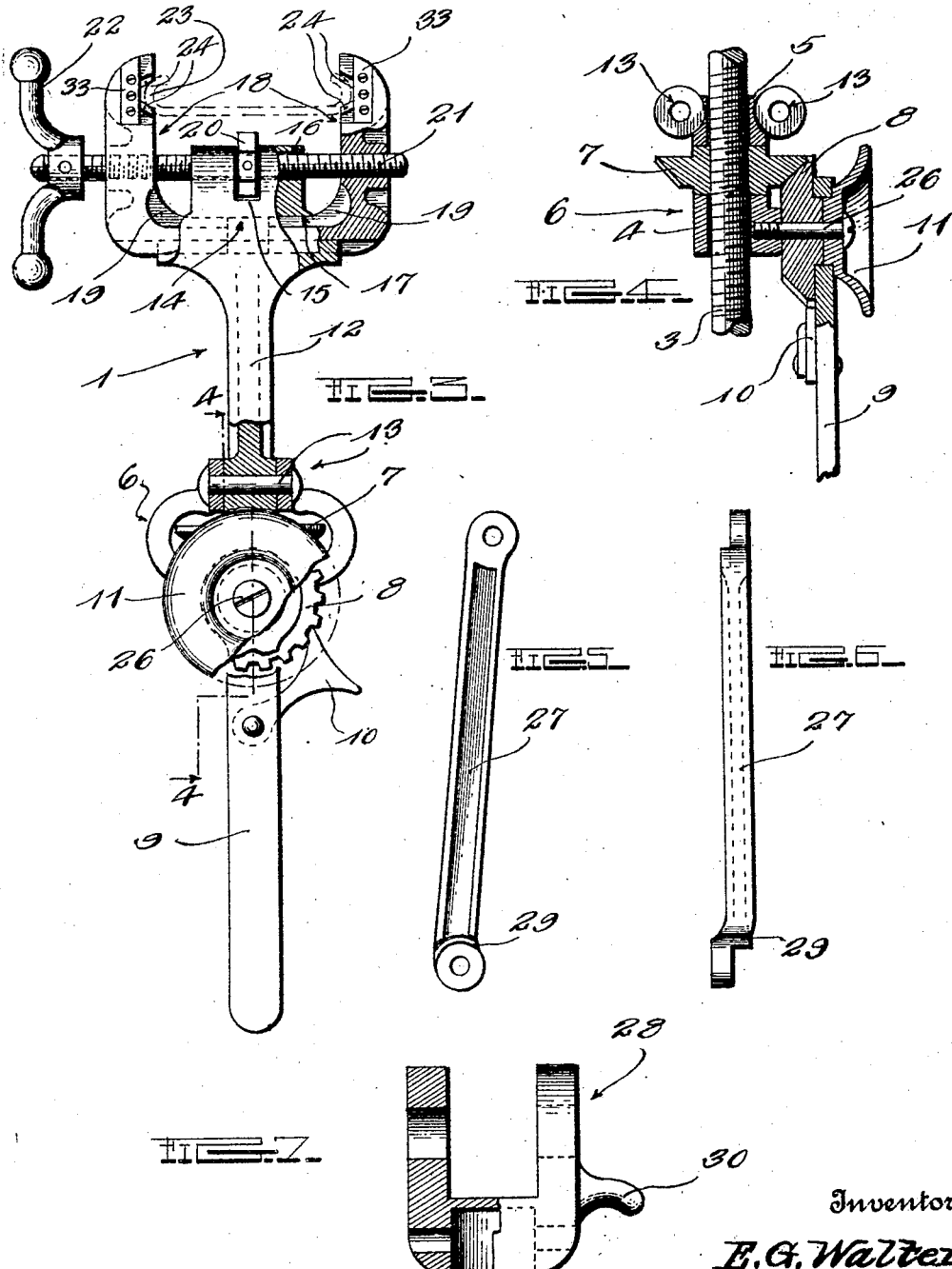

1,531,771

UNITED STATES PATENT OFFICE.

EDWIN G. WALTER AND HARRY M. SMITH, OF ELKHART, INDIANA.

AUTOMOBILE RIM TOOL.

Application filed January 23, 1922. Serial No. 531,249.

*To all whom it may concern:*

Be it known that we, EDWIN G. WALTER and HARRY M. SMITH, citizens of the United States, residing at Elkhart, in the county of Elkhart and State of Indiana, have invented certain new and useful Improvements in Automobile Rim Tools; and they do declare the following to be a full, clear, and exact description of the invention, such as will enable others skilled in the art to which it appertains to make and use the same.

This invention relates to an improved tool for contracting and expanding demountable rims such as are used on automobile wheels.

The principal object of the invention is to generally improve upon tools of this class by providing one of extreme simplicity and durability which is easy to attach and detach and is easy and convenient to manipulate.

Another object of the invention is to provide a tool of this class which simply embodies a pair of rim-engaging devices which are designed to grip the ends of a rim on opposite sides of the transverse split together with radially movable means arranged between these devices for actuating them and varying the diameter of the rim to permit easy and ready application and removal thereof to or from the tire.

Another object of the invention is to associate with the aforesaid structure, means which is co-operative with the radially movable means and is engageable with one of the ends of the rim for either alining or disalining the ends of the rim.

A further object of the invention is to provide a tool of this class wherein the rim-engaging members are moved toward and from each other by means of an operating lever, and there being means which is usable in place of the lever for enabling a very quick adjustment to be had, which is not obtainable when using the lever.

Other objects and advantages of the invention will be apparent during the course of the following description.

In the accompanying drawings forming a part of this specification and in which like numerals are employed to designate like parts throughout the same:

Figure 1 is an elevational view of a rim tool constructed in accordance with this invention showing the same associated with a demountable rim and tire and showing the parts in the position they assume after the rim ends are separated.

Figure 2 is a view like Fig. 1 showing the position of parts when the rim is contracted to permit removal or replacement of the tire.

Figure 3 is an enlarged detail section taken substantially on the plane of the line 3—3 of Fig. 1.

Figure 4 is a detail section taken substantialy on the plane of the line 4—4 of Fig. 3.

Figures 5 and 6 are detail elevational views of the toggle links.

Figure 7 is a detail elevational view, partially in section, of the socket member.

Referring to the drawings in detail, the numeral 1 designates generally the improved rim-engaging devices which are designed, as before indicated, for gripping the rim R on opposite sides of the transverse split. Disposed between these devices 1 is the radially movable means 2 which in its preferred form is a toggle member, the same being operated by a radially movable screw 3 passing through the alined and spaced tubular portions 4 and 5 respectively of the body member 6. A nut 7 is arranged between the parts 4 and 5 of the body member and serves to operate the screw when it is rotated by means of the combined gear and ratchet member 8. This member 8 is operated in one instance by a manually actuated lever 9 carrying a reversible pawl 10 for engaging the ratchet teeth of said member 8. When using the lever solely for operating the device, the operation is comparatively slow and it is desired to provide means for enabling this operation to be carried out very quickly at times and a supplemental quick operating member 11 is employed for accomplishing this end. So far as the description has gone, it has set forth in a general way the details of construction employed and the following description will deal with the specific and preferred details employed. Before proceeding with such description, it may be added here that there is removable means interposed between the rim and radially movable means 2 for alining or disalining the ends of the rim as before briefly referred to.

Attention will be first directed to the specific disclosure of the rim-engaging devices 1 shown in Fig. 3. Reference being had to this figure, it will be seen that each device comprises an arm 12 which is pivotally connected with the part 5 of the aforesaid body 6 as indicated at 13. Inasmuch as both of the rim-engaging devices are the same in construction, the description will appear in the singular. Proceeding, it is to be stated that the arm 12 is equipped at its outer end with an enlargement constituting a head 14 and this head is formed with a notch 15 and a horizontal bore 16. It is also formed with sockets 17 which serve a purpose to be hereinafter set forth. Arranged on opposite sides of the head and movable toward and from it are a pair of jaws 18 having laterally and inwardly directed guide extensions 19 extending into said sockets 17. Suitable coacting means in the form of a rib and groove is employed for preventing rotation of the extensions in the sockets. A nut 20 is located in the notch 15 and an adjusting screw 21 extends through this nut and through the aforesaid bore, also extending through screw-threaded openings formed in the jaws 18. An operating member 22 is fixedly connected to the projecting end of the screw. This screw simply rotates in the bore 16 and is not slidable therethrough and it is equipped with left and right screw-threads so that when it is rotated, it will move the jaws toward and from each other to accommodate and effectively grip rims of varying widths. By carefully examining the jaws, it will be seen that these are formed at their inner sides and near their outer ends with grooves 23 in which the curved flanges of the rim extend and these grooves are reduced in width toward their centers as indicated at 24 for providing a knife-like edge which insures an effective grip on the rim.

Directing attention now to the detail sectional view appearing in Fig. 4, it will be seen that a removable shaft 26 is connected with parts 4 of the aforesaid body and the combined gear and ratchet 8 is rotatable thereon. The finger operating member 11 is also rotatable on this shaft and this member is keyed or otherwise detachably connected with the member 8 to cause simultaneous rotation of these members. These members embody reduced portions which when brought together constitutes a journal for the operating lever 9. The operating lever is operated independent of the member 11 and the latter is used when a quick adjustment is desired.

It has been before indicated that the radially movable means which serves to operate the rim-engaging devices is in the form of a toggle and this is made up of a pair of duplicate links 27 which are pivotally connected at their upper ends with the heads 14 and are pivotally connected at their lower ends with a socket member 28. The upper end of the aforesaid operating screw is fixedly connected with this socket member so as to open and close the toggle when the screw is moved longitudinally. The lower ends of the toggle links 27 are offset as indicated at 29 to insure effective operation of these parts and to prevent binding. By directing attention to the detail view of the socket member indicated in Fig. 7, it will be seen that this member is equipped with an integral laterally disposed lug 30 which serves a purpose to be hereinafter described.

The means which is interposed between the toggle and one end of the rim for alining or disalining the ends is shown in Fig. 1. This means in its preferred form simply comprises a chain 31 having a hook 32 at one end adapted to take over one of the rim flanges adjacent the split. One of the links of the chain is designed to be slipped over the lug 30 and when the screw 3 is operated, the chain will be drawn inwardly for accomplishing the end set forth. It will be noted that this chain is adapted for alining or disalining the ends of the ring. To describe this more exactly, it will be recalled that when the rim is off of the tire, it often happens that one end resists inward movement for alining it with the other end. However, by using this chain, the ends can be brought into proper alinement. When my improved tool is used for contracting the rim to enable easy and ready removal of the tire, the chain is used for disalining the ends of the rim so that they can then be brought into overlapping relationship when the rim-engaging devices are moved toward each other as disclosed in Fig. 2. As soon as the ends of the rim are so disalined, the chain can be removed.

It is yet to be pointed out that plates 33 are used in connection with the rim-gripping jaws and are fixed to the opposite ends of the latter so as to partially close one end of the grooves 23. These plates are intended to prevent undesirable canting of the jaws which sometimes occurs. In practice, the forward edges of the plates will be sharpened so that when in use they will bite into the metal of the rim and prevent slippage of the jaws.

The operation of the tool is as follows: Assuming that the tool has been engaged with the rim in the manner disclosed in Fig. 1, the lever 9 is grasped and moved in a direction to move the screw 3 inwardly. Of course, prior to this, the chain 31 is engaged with the lug 30 and the hook 32 engaged with the rim of the flange adjacent the transverse split. Consequently, as soon as the screw begins to move inwardly, the ends of the rim are disalined. Then, the chain can be removed. Further inward movement of the screw will, through the medium of the toggle links actuate the rim-engaging devices 1 toward each other, to bring the ends of the rim into overlapping relationship and decrease the diameter of the rim to such an extent as to permit the tire to be easily and readily removed or replaced whichever may be the case. To disengage the tool from the rim, it is only necessary to grasp the operating device 22 and rotate the screw 21 in a direction to move the jaws 18 apart. If the parts are in the position shown in Fig. 2 and it is desired to arrange them in the approximate position shown in Fig. 1, this may be quickly done by grasping the member 11 and rotating it in the proper direction instead of using the lever 9.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, we wish it to be understood that minor changes coming within the scope of the invention as claimed, may be resorted to if desired.

We claim:

1. A rim tool comprising a pair of rim engaging devices adapted to grip the ends of a rim on opposite sides of the transverse split; radially movable means between said devices for spreading them apart to separate the rim ends, means for connecting one rim end to said radially movable means to disaline said rim ends when said devices are drawn toward each other; and means for actuating said radially movable means.

2. A rim tool comprising a pair of pivotally connected arms having rim-engaging devices at their free ends for gripping the ends of a transversely spilt rim on opposite sides of the split, pivotally connected toggle links having their free ends pivoted to said devices for actuating them, a radially movable screw for operating said links to move said rim-engaging devices so as to vary the diameter of the rim, and reversible means for feeding the screw longitudinally in opposite directions with respect to the pivotal connection between said devices in accomplishing the mentioned result.

3. A rim tool comprising a pair of rim engaging devices adapted to grip the ends of a demountable rim on opposite sides of the transverse split, radially movable means disposed between said devices for actuating them to vary the diameter of the rim, and means interposed between said radially movable means and one end of the rim for alining or disalining said ends.

4. A rim tool comprising a pair of rim engaging devices adapted to grip the ends of a rim on opposite sides of the transverse split thereof; said devices being pivotally mounted adjacent their bases; radially movable means between said devices and movable outwardly to separate the rim ends and thereafter movable inwardly to disaline said rim ends, said means being connected with said devices intermediate their outer extremities and said pivotal mounts; and means for actuating said radially movable means.

5. A rim tool comprising a pair of rim-engaging devices adapted to grip the ends of a demountable rim on opposite sides of the transverse split, pivotally connected toggle links arranged between said devices and having their free ends pivotally connected thereto, means for moving the pivotally connected portions of said toggle links radially for actuating said rim-engaging devices and varying the diameter of the rim, and means attached to the pivotally connected portions of the toggle links for disalining the ends of the rim.

6. A rim tool having a body member including a bearing, rim-engaging devices diverging from said bearing and pivotally connected therewith, a screw longitudinally movable in said body member, toggle links pivotally connected to said screw and to said rim-engaging devices for moving said devices toward and away from each other, a nut carried by said body member and operatively engaging said screw, a gear co-operating with said nut for rotating the latter and axially moving the screw, a lever, and a reversible pawl carried by said lever to engage said gear for increasing or decreasing the diameter of the rim.

7. A rim tool having a body member including a bearing, rim-engaging devices diverging from said bearing and pivotally connected therewith, a screw longitudinally movable in said body member, means operatively connected to said screw for moving said devices toward and away from each other, a nut carried by said body member and fitted around said screw, a shaft journaled in said body member, a gear mounted on said shaft and co-operating with said nut for rotating the latter, and a pawl-carrying lever fulcrumed on said shaft and adapted to actuate said gear.

8. A rim tool having a body member including a bearing, rim-engaging devices diverging from said bearing and pivotally connected therewith, a screw longitudinally movable in said body member, toggle links pivotally connected to said screw and to said rim-engaging devices for moving said devices toward and away from each other, a nut carried by said body member and fitted around said screw, a shaft journaled in said body member, a gear mounted on said shaft and co-operating with said nut for rotating on the latter, a lever fulcrumed on said shaft beyond the gear and adapted to actuate said gear, a reversible pawl carried by said lever and a finger-rotated device swiveled on the outer end of said shaft beyond the fulcrum of said lever and connected with said gear for quickly turning the latter independently of said lever.

In testimony whereof we have hereunto set our hands.

EDWIN G. WALTER.
HARRY M. SMITH.